(12) United States Patent
Perahia et al.

(10) Patent No.: US 10,240,925 B1
(45) Date of Patent: Mar. 26, 2019

(54) GRADIENT FORCE DISK RESONATING GYROSCOPE

(71) Applicant: HRL Laboratories, LLC, Malibu, CA (US)

(72) Inventors: Raviv Perahia, Calabasas, CA (US); Jonathan Lake, Hidden Hills, CA (US); Richard J. Joyce, Thousand Oaks, CA (US); Logan D. Sorenson, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 201 days.

(21) Appl. No.: 15/083,190

(22) Filed: Mar. 28, 2016

(51) Int. Cl.
*G01C 19/5684* (2012.01)
*G01C 25/00* (2006.01)

(52) U.S. Cl.
CPC ......... *G01C 19/5684* (2013.01); *G01C 25/00* (2013.01)

(58) Field of Classification Search
CPC ................................................ G01C 19/5719
USPC ...................................................... 73/504.13
See application file for complete search history.

(56) References Cited

U.S. PATENT DOCUMENTS

| | | | |
|---|---|---|---|
| 7,040,163 B2 | 5/2006 | Shcheglov et al. | |
| 7,581,443 B2 | 9/2009 | Kubena et al. | |
| 8,305,154 B1 | 11/2012 | Kubena et al. | |
| 8,569,937 B1 | 10/2013 | Kubena et al. | |
| 8,765,615 B1 | 7/2014 | Chang et al. | |
| 8,766,745 B1 | 7/2014 | Kubena et al. | |
| 9,038,459 B1 | 5/2015 | Kubena | |
| 9,404,748 B2 | 8/2016 | Perahia et al. | |
| 2005/0172714 A1* | 8/2005 | Challoner ......... | G01C 19/5684 73/504.12 |
| 2007/0017287 A1* | 1/2007 | Kubena ............. | G01C 19/5684 73/504.02 |
| 2007/0220971 A1* | 9/2007 | Ayazi ................ | G01C 19/5698 73/504.02 |
| 2010/0024546 A1* | 2/2010 | Challoner ......... | G01C 19/5684 73/504.08 |
| 2012/0137774 A1* | 6/2012 | Judy ................. | G01C 19/5698 73/504.12 |

OTHER PUBLICATIONS

U.S. Appl. No. 14/024,506, filed Sep. 11, 2013, Kirby et al.
U.S. Appl. No. 14/456,808, filed Aug. 11, 2014, Kirby et al.

* cited by examiner

*Primary Examiner* — Natalie Huls
*Assistant Examiner* — Monica S Young
(74) *Attorney, Agent, or Firm* — Ladas & Parry

(57) ABSTRACT

A gyroscope includes a vibratory structure, and a control mechanism including at least a first electrode, and at least a second electrode adjacent the first electrode, wherein the vibratory structure is separated from the control mechanism by a gap, wherein to drive a vibration in the vibratory structure, the control mechanism is configured to apply an alternating electrical voltage between the first electrode and the second electrode, and wherein to sense motion in the vibratory structure, the control mechanism is configured to apply a direct current voltage bias between the first electrode and the second electrode.

22 Claims, 15 Drawing Sheets

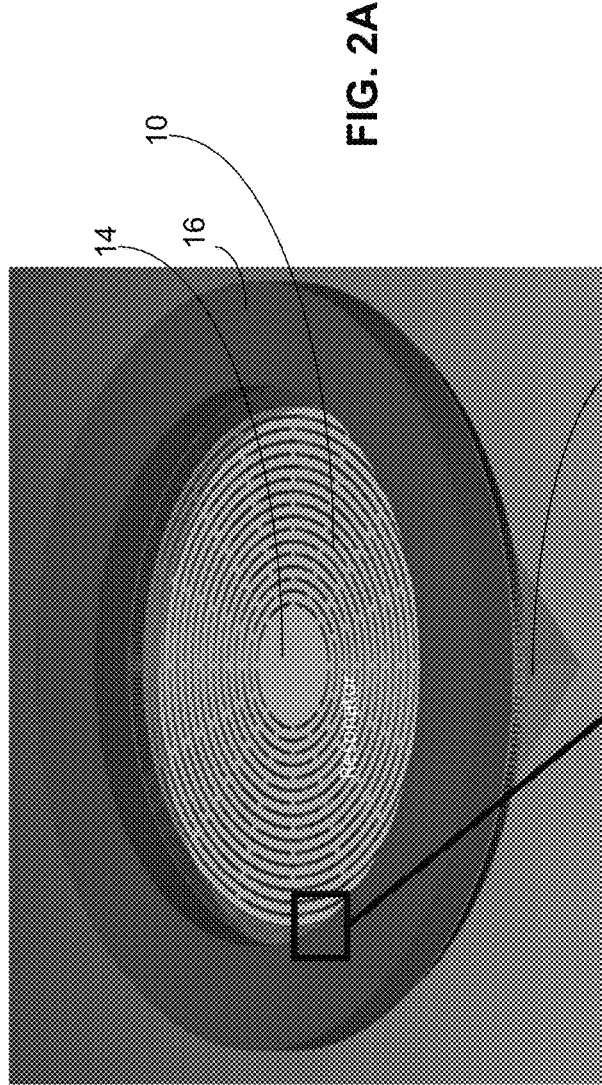
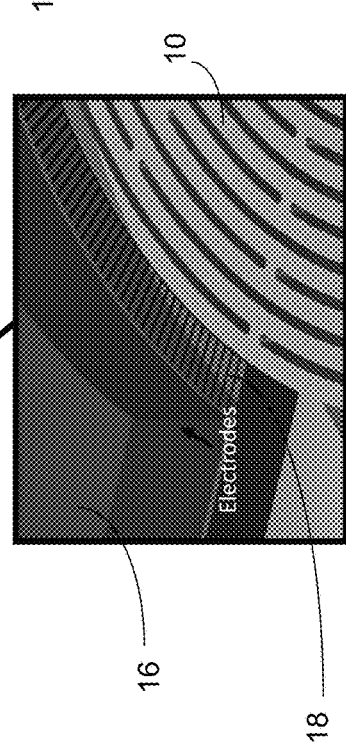
FIG. 2A
FIG. 2B

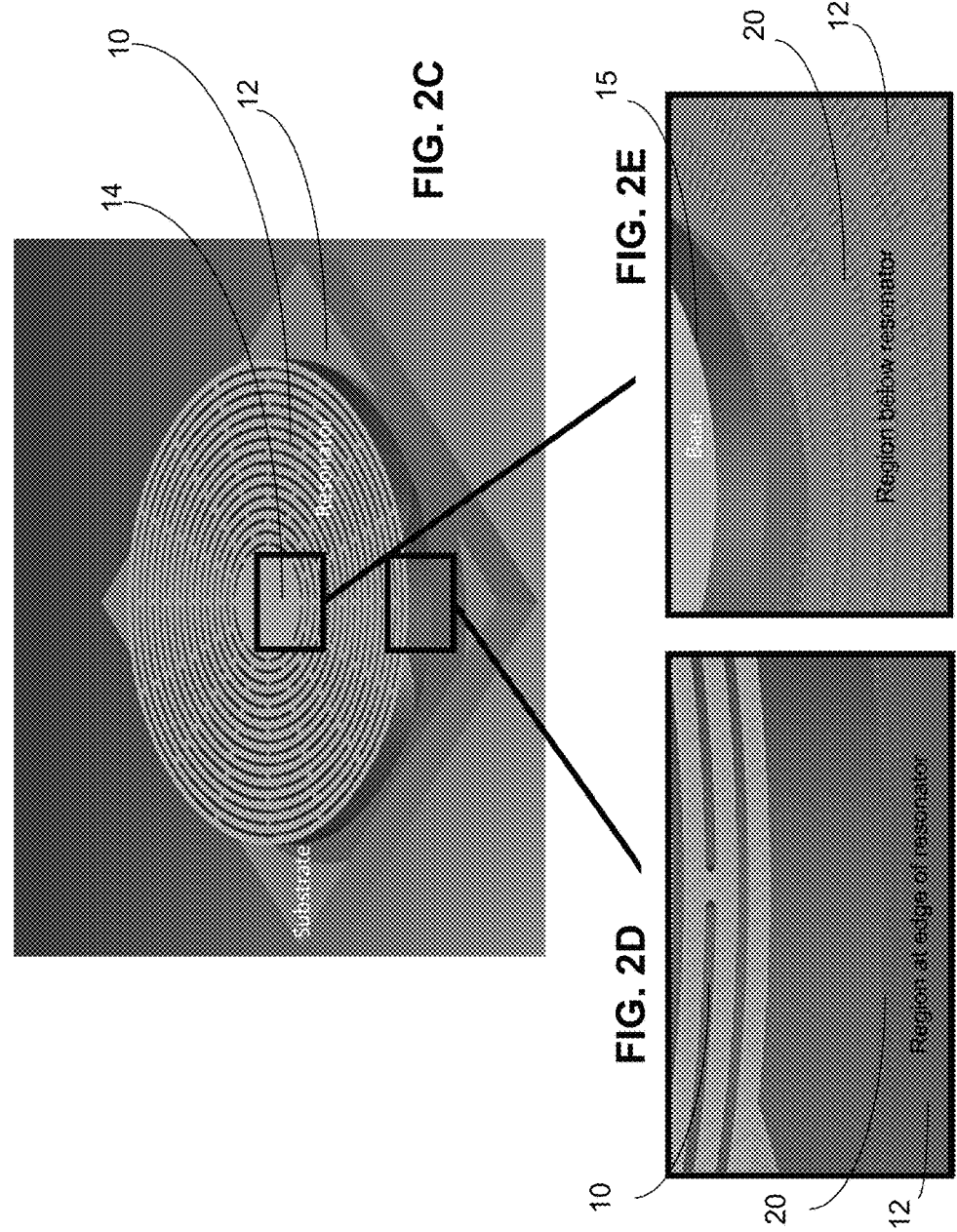

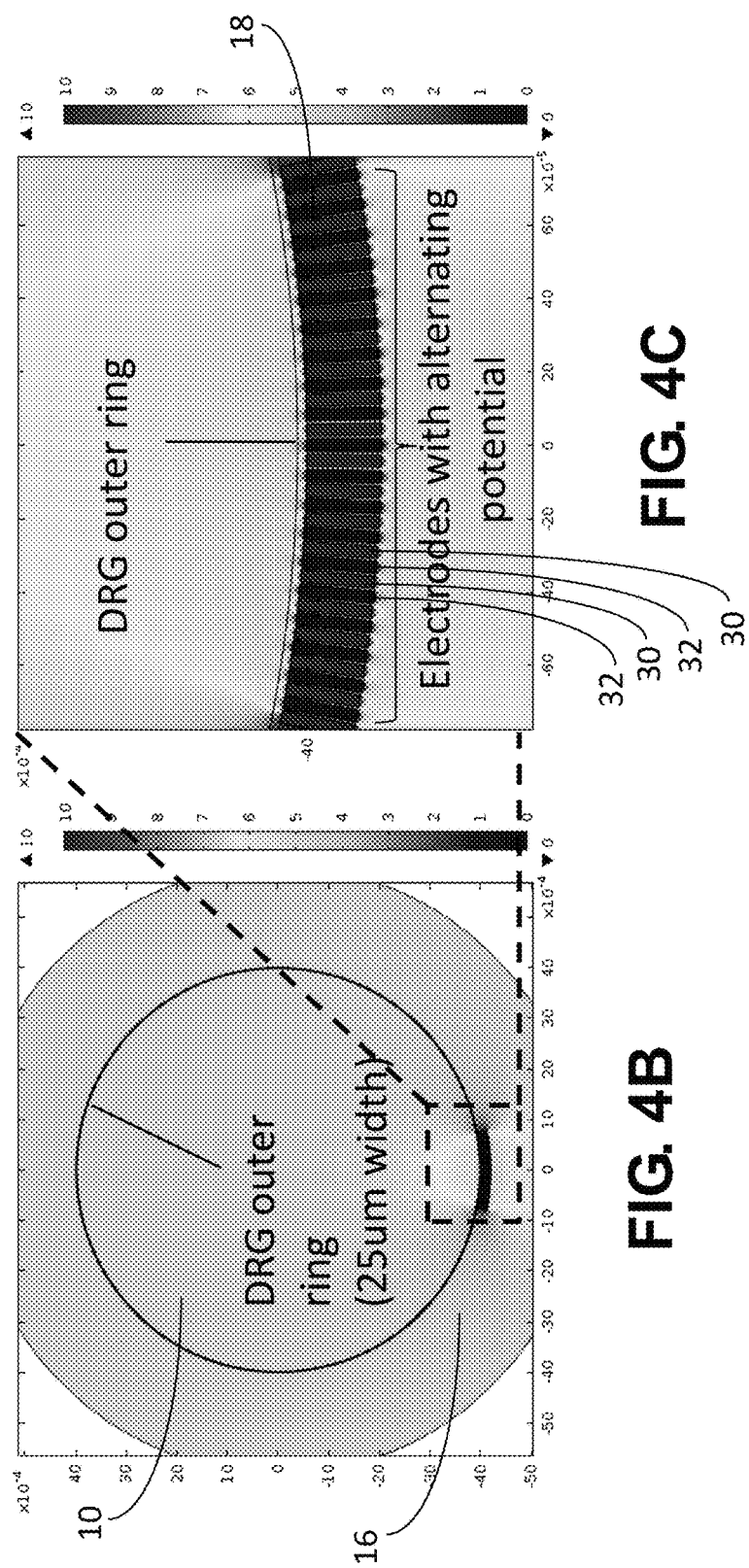

GRADIENT FORCE DISK RESONATING GYROSCOPE

CROSS REFERENCE TO RELATED APPLICATIONS

This application is related to U.S. patent application Ser. No. 14/024,506, filed Sep. 11, 2013, and to U.S. patent application Ser. No. 13/930,769, filed Jun. 28, 2013 which are incorporated herein as though set forth in full.

STATEMENT REGARDING FEDERAL FUNDING

None

TECHNICAL FIELD

This disclosure relates to gyroscopes and in particular to disk resonating gyroscopes (DRGs).

BACKGROUND

A navigation grade gyroscope has a bias of less than 0.01 deg/hr and an angular random walk (ARW) of less than 0.001 deg/rt(hr). One type of gyroscope is a micro-scale disk resonator gyroscope (DRG). In the prior art this type of gyroscope does not meet the standards for navigation grade performance.

The prior art DRG designs rely on the DRG being conductive either by choosing a conductive structural material, such as doped Si, or by coating a dielectric structural material, such as fused silica, with a thin metallic layer. The control structure of the DRG for drive, sense, and tuning is usually a set of electrodes placed between the resonating rings of the DRG. In the case of a Si DRG, the ultimate performance of the gyroscope is limited by the low material quality factor (Q) of silicon, which has a Q less than 100 k. In the case of a fused silica DRG the performance has been limited by the metal coatings, with Q dropping from Q~1e6 to Q~200 k after a coating of only 10s of angstroms of metal. Furthermore, the tight gaps between the electrodes and vibratory structure make fabrication of a symmetric structure extremely difficult due to limitations of deep reactive ion etching (DRIE).

An example of the prior art is U.S. Pat. No. 7,040,163, which issued May 9, 2006. As shown in FIGS. 1A and 1B, this prior art relies on an internal electrode structure 108A and the electrical conductivity of the resonating structure 100. Another example of the prior art is U.S. Pat. No. 7,581,443, which issued Sep. 1, 2009, and as shown in FIG. 1C, this prior art critically depends on electrode structures 104 and 106, which are also on the resonating structure 100.

U.S. patent application Ser. No. 14/024,506, filed Sep. 11, 2013, which is incorporated herein by reference, describes a touch-free drive/sense mechanism for a small and light micro-shell, which is further described in U.S. patent application Ser. No. 13/930,769, filed Jun. 28, 2013, which is incorporated herein by reference. A DRG structure, which may be 8 mm in diameter and 125 um thick is significantly different in size and proportions than a micro-shell, which may be a 1 mm diameter hollow cylinder that is 350 um tall with a wall thickness of 2 um. Thus a DRG has 1000 times more mass than such a microshell. Due to that difference in size and mass, it is unexpected that a gradient force mechanism for drive and particularly for sense for a DRG would be sufficient to achieve navigation grade performance of such a large structure. For such a greater mass both sufficient force to drive the DRG as well as sufficient sensitivity are needed.

What is needed is a device and method to drive, sense, and tune a DRG without any electrode structures or coatings, so that a high quality factor can be achieved. The embodiments of the present disclosure answer these and other needs.

SUMMARY

In a first embodiment disclosed herein, a gyroscope comprises a vibratory structure, and a control mechanism comprising at least a first electrode, and at least a second electrode adjacent the first electrode, wherein the vibratory structure is separated from the control mechanism by a gap, wherein to drive a vibration in the vibratory structure, the control mechanism is configured to apply an alternating electrical voltage between the first electrode and the second electrode, and wherein to sense motion in the vibratory structure, the control mechanism is configured to apply a direct current voltage bias between the first electrode and the second electrode In another embodiment disclosed herein, a method of providing a gyroscope comprises providing a vibratory structure, and providing a control mechanism comprising at least a first electrode, and at least a second electrode adjacent the first electrode, wherein the vibratory structure is separated from the control mechanism by a gap, wherein to drive a vibration in the vibratory structure, the control mechanism is configured to apply an alternating electrical voltage between the first electrode and the second electrode, and wherein to sense motion in the vibratory structure, the control mechanism is configured to apply a direct current voltage bias between the first electrode and the second electrode.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 2A and FIG. 2B, which is a detail of FIG. 2A, show a periphery drive, sense and tuning mechanism, and FIG. 2C and FIGS. 2D and 2E show a substrate drive, sense and tuning mechanism in accordance with the present disclosure;

FIG. 4B shows a finite element model of the electric potential on the outer ring of a DRG, and FIG. 4C, which is a detail of FIG. 4B, shows an electric potential exerted on the outer ring of the DRG by a set of electrodes with alternating potential in accordance with the present disclosure;

DETAILED DESCRIPTION

Figure 1B:
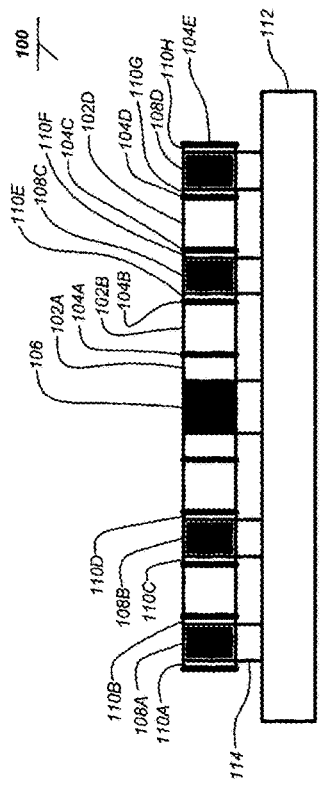
FIGS. 1A, 1B, and 1C show disk resonating gyroscopes having electrodes in accordance with the prior art.
Figure 1A:
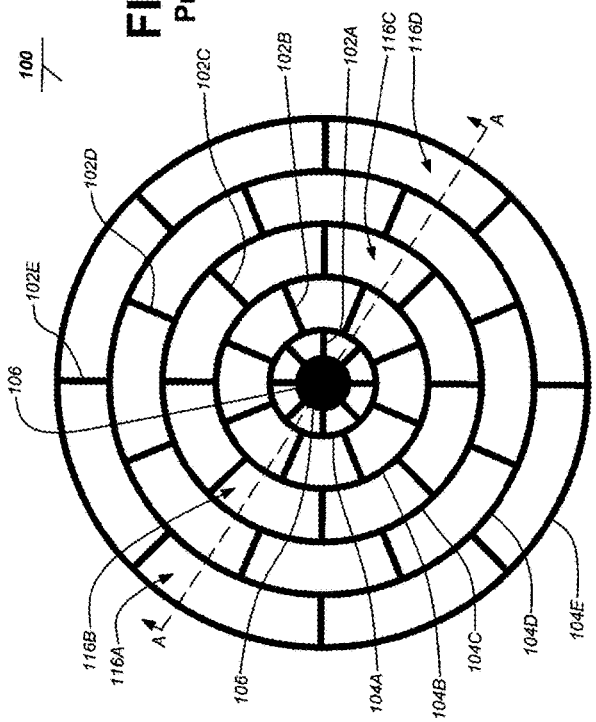
Figure 1C:
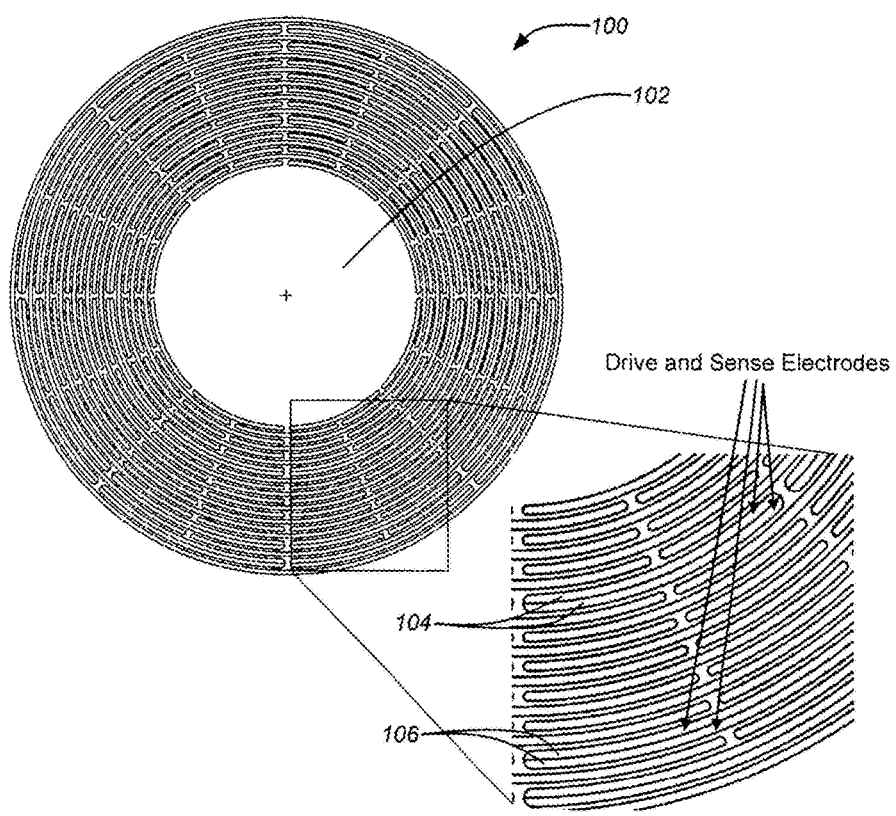

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a disk resonating gyroscope (DRG) that is controlled using a gradient electric field mechanism without direct contact with the vibratory structure. Such a control mechanism allows the vibratory structure of a dielectric DRG to achieve its ultimate quality factor and therefore ultimate navigation grade performance. The control mechanism of the present disclosure removes the need for a conductive layer to be directly deposited on the vibratory structure which limits performance in some prior art DRGs. Furthermore, the control mechanism of the present disclosure eliminates the electrode structures typically found between the rings of the DRG, significantly reducing complexity of fabrication and therefore improving the ultimate symmetry achievable.

The present disclosure describes how to achieve the ultimate mechanical quality factor (Q) for a fused silica DRG. The present disclosure applies to dielectrics in general; however, preferred materials are fused silica, low expansion glasses, silicon nitride, diamond, silicon carbide, and sapphire. The present disclosure replaces the prior art direct electrostatic control mechanisms with gradient mechanisms, and changes the overall design of the DRG.

As discussed above, prior art DRG designs rely on the DRG being conductive either by choosing a conductive structural material, such as doped Si, or by coating a dielectric structural material, such as fused silica, with a thin metallic layer. The control structure of the DRG for drive, sense, and tuning is usually a set of electrodes placed between the resonating rings of the DRG. In the case of a Si DRG, the ultimate performance of the gyroscope is limited by the low material quality factor (Q) of silicon, which has a Q<100 k. In the case a fused silica DRG the performance in the prior art has been limited by the metal coatings, with Q dropping from Q~1e6 to Q~200 k after coating of metal with a thickness of only 10s of angstroms. Furthermore, the tight gaps between the electrodes and vibratory structure make fabrication of a symmetric structures in the prior art extremely difficult due to limitations of deep reactive ion etching (DRIE).

The use of electric gradient force control structures solves the challenges with the fused silica DRG in two ways. First, the gradient control mechanism allows driving, sensing, and tuning the mechanical modes of a dielectric DRG without direct application of electrodes, and second the electrodes typically found between the DRG rings are no longer needed, significantly reducing DRIE etch selectivity ratios needed to fabricate the structure.

Because the present disclosure allows for drive, sense, and tune control of the resonating structure without any electrode structures, the DRGs of the present disclosure not only benefit from the high quality factor of the dielectric materials and easier fabrication, but in addition DRG structures can also be modified as needed for improved performance and ease of fabrication.

As discussed above, it is unexpected that a gradient force mechanism for drive and particularly sense would be sufficient to achieve navigation grade performance of a DRG with such a large mass. As such the present disclosure solves a long standing technical hurdle that has prevented fused silica gyroscopes from become leading gyroscope devices.

Referring now to FIG. 2A, the gradient force gyroscope of the present disclosure has two distinct structures namely, the vibratory structure and the control structure or mechanism. The vibratory structure, may be a disk 10 that is elevated from a substrate 12. The vibratory structure may be anchored by anchor or pedestal 14 in the center of the disk 10, as shown in FIG. 2C, to a base 15 on the substrate 12, as shown in FIG. 2E. The disk 10 may be a dielectric material, such as silica, silicon nitride, diamond, silicon carbide, sapphire, and any other suitable material. The vibratory structure has orthogonal wineglass mechanical modes that are sensitive to the Coriolis force. For a fused silica disk 10 with a diameter of 8 mm, and a thickness of 125 um, and an anchor or pedestal 14 with a diameter of 4 mm, the n=2 wineglass modes are at approximate frequency f~12 kHz. The vibrating structure 10 may be uniform and does not need to have any special features or regions that correspond to drive, sense, or tuning mechanisms.

The control structure 16 of the present disclosure allows for driving and sensing motion of the disk 10. The control structure may also be used to tune a resonant frequency of the vibratory structure 10. The control structure 16 is not in contact with the disk 10. A portion of vibratory portion of the DRG, such as disk 10, may or may not be electrically conductive; however, the vibratory structure is preferably a dielectric with the region of the disk 10 that interacts with the electrodes being a dielectric. If the vibratory portion of the DRG is conductive, then it must be coated with a dielectric.

In first configuration of the control structure 16, shown in FIGS. 2A and 2B, the control structure 16 is along the periphery of the vibratory structure or the disk 10. FIG. 2B is a detail of a portion of FIG. 2A and shows electrodes 18 along the periphery of the disk 10; however the electrodes 18 are not in contact with the disk 10. In another configuration of the control structure 16, as shown in FIGS. 2C, 2D and 2E the control structure 16 is on the substrate 12 underneath the vibratory gyroscope or disk 10. FIGS. 2D and 2E are details of portions of FIG. 2C and show electrodes 20 on the substrate 12 at the edge of the disk 10, or electrodes 20 on the substrate 12 below the disk 10, respectively. In FIG. 2E, the base 15 is shown, but portions of the disk 10 are not shown in order that the electrodes 20 on the substrate 12 below the disk 10 are visible. In both FIGS. 2D and 2E, the electrodes 20 are not in contact with the disk 10.

As will be described further below, the control mechanism can be either below, above, or both below and above the vibratory structure 10. The control structure shown in FIGS. 2A and 2B may be referred to as a periphery control mechanism. The control structure shown in FIGS. 2C, 2D, and 2E may be referred to as an above/below control mechanism.

Figure 3A:
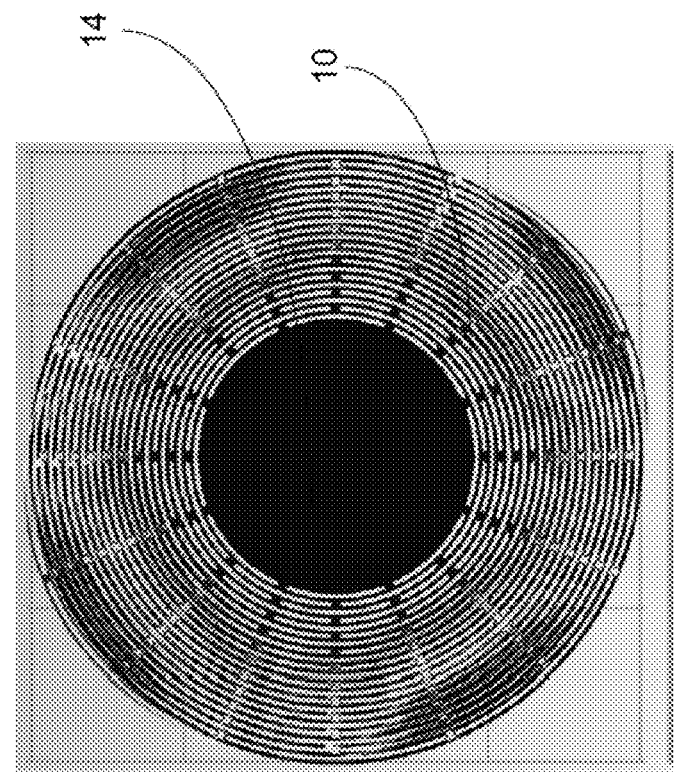
FIGS. 3A and 3B show vibrating mechanical modes, in which the vibrating structure is uniform and does not have special features or regions that correspond to drive, sense, or tuning structure in accordance with the present disclosure.
Figure 3B:
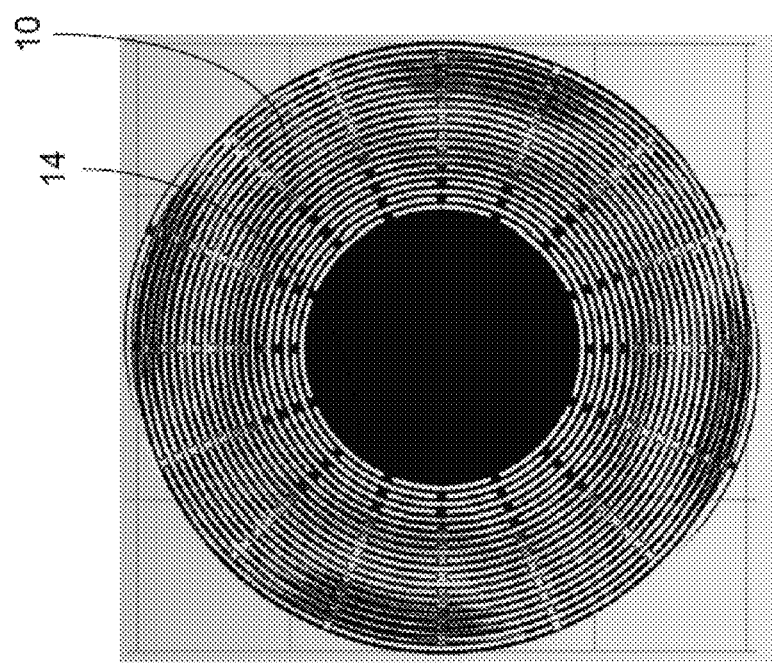

FIGS. 3A and 3B show the n=2 wineglass mechanical modes having a resonant frequency of f~12 kHz for a disk 10 of fused silica with a diameter of 8 mm, a thickness of 125 um, and an anchor or pedestal 14 diameter of 4 mm. The vibrating structure or disk 10 is uniform and does not have special features or regions that correspond to drive, sense, or tuning structures.

The following technical discussion demonstrates that both peripheral or above/below control mechanisms can achieve navigation grade performance, which requires that the control mechanism have enough force to drive the vibratory structure into oscillations and is able to sense motion with bias stability of less than 0.01 deg/hr, which is navigation grade. As an example in the following, 1 um of motion of the vibratory structure is used. These calculations are meant for illustration only and are not limiting on the scope of the present disclosure as to the specific dimensions used in the example. Also, there is no frequency limit to the efficacy of either control mechanisms which may operate over a range from single Hz mechanical and electrical frequencies to GHz frequencies.

Figure 4A:
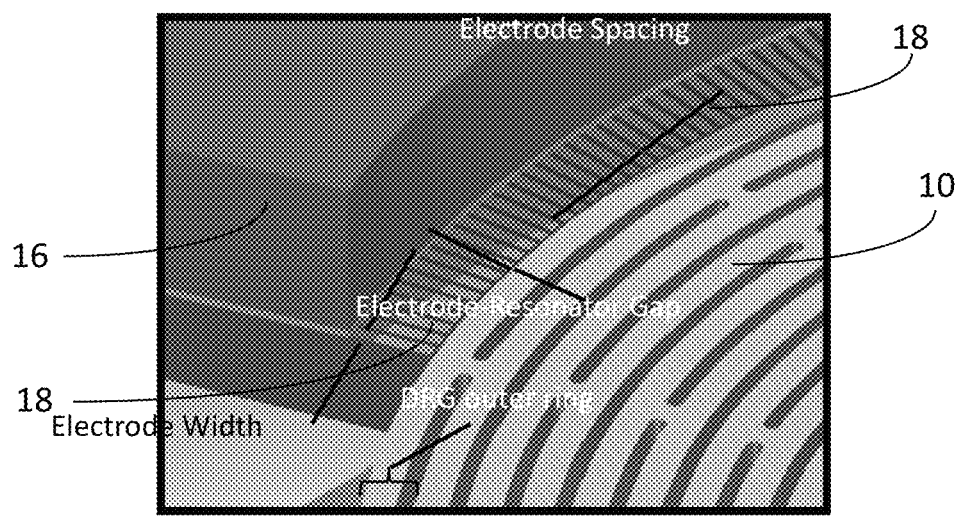
FIG. 4A shows a schematic of a control mechanism fabricated and placed in proximity to a DRG vibratory structure.

FIG. 4A shows a periphery drive, sense, and tuning control mechanism in accordance with the present disclosure. A set of conducting electrodes 18 are located near the periphery of the vibratory structure or disk 10. The gap between the electrodes 18 and the disk 10 can be as small as 10s of nanometers and as large as 10s of microns depending on the resonant frequency. The same type of ranges may apply to the thickness, width, and spacing of the electrodes 18. The thickness or height of the electrodes 18 may be matched to the thickness of the vibratory structure 10 to maximize the performance of the control mechanism. Finite element simulations (FEMs) have been used to test the DRG configurations.

In an example FEM, the electrodes 18 were set to be 35 um wide with a distance between electrodes 18 set to be 4 um. The thickness of the electrodes 18 was chosen to be 125 um to match the thickness for the fused silica disks 10 shown in FIGS. 3A and 3B. To mimic a DRG vibratory structure a ring of width 25 um was used as shown in FIG. 4B. The concept can be fully demonstrated by simulating only $\frac{1}{16}^{th}$ of the structure.

To drive the vibratory structure 10 an alternating current (AC) voltage is applied to alternating adjacent electrodes 18, so that adjacent electrodes 18 have potentials that alternate in potential. Therefore if a particular electrode 30, as shown in FIG. 4C, has a potential at a particular time, then an adjacent electrodes 32 may have an opposite potential at that particular time. So if electrodes 30 have a positive potential, then the electrodes 32 may have a relatively negative potential. However, it is not necessary that the electrodes 30 have a positive potential and the electrodes 32 have a negative potential. What is required is that there is a difference in potential or voltage between the electrodes 30 and the electrodes 32. For example, if electrode 30 is at +5V then electrode 32 can be any voltage less than +5V as long as there is a difference.

As shown in FIG. 4C the electrodes 30 alternate with the electrodes 32. The result is that an alternating force is applied to the vibratory structure 10. A maximum amplitude of the vibration of disk 10 is achieved at the resonant frequency of the disk 10; however, it may be best for stability to slightly detune from the resonant frequency. To sense motion, a direct current (DC) bias is applied to alternating sets of electrodes 30 and 32. So, for example, electrodes 30 may be biased to a DC voltage of 10 volts and the electrodes 32 may be biased to zero voltage. Any change in capacitance due to motion of the disk 10 results in a change of charge state at the electrodes 30 and 32, which causes a current, which may be measured using a trans-impedance amplifier (TIA). Finally to tune the resonant frequency of the vibratory structure 10, a DC voltage bias may either be applied directly to the electrodes 30 and 32, or a bias from the average value of the AC may be used.

In the example shown in FIG. 4C, a potential of 10V is applied to alternating set of electrodes 18, such as electrodes 30 with the electrodes 32 having 0V, then the electrodes 30 are set to 0V and the electrodes 32 set to 10V, and this repeats. The value of 10V is used for simplicity; however, other alternating voltages may be used. The key is for there to be a potential difference between alternating electrodes 30 and 32 to generate a fringe field. Larger voltages (>100V) can be used as long as the field intensity between the electrodes 30 and 32 does not reach levels corresponding to dielectric breakdown between the electrodes.

In this example case, the gap between the electrodes 30 and 32 and the vibratory structure or disk 10 is varied from 500 nm to 5 um. The capacitance and radial force is then calculated using FEM simulations versus the gap between the electrodes 30 and 32 and the vibratory structure 10. The results are shown in FIGS. 5A, 5B, 5C and 5D.

Figure 5A:
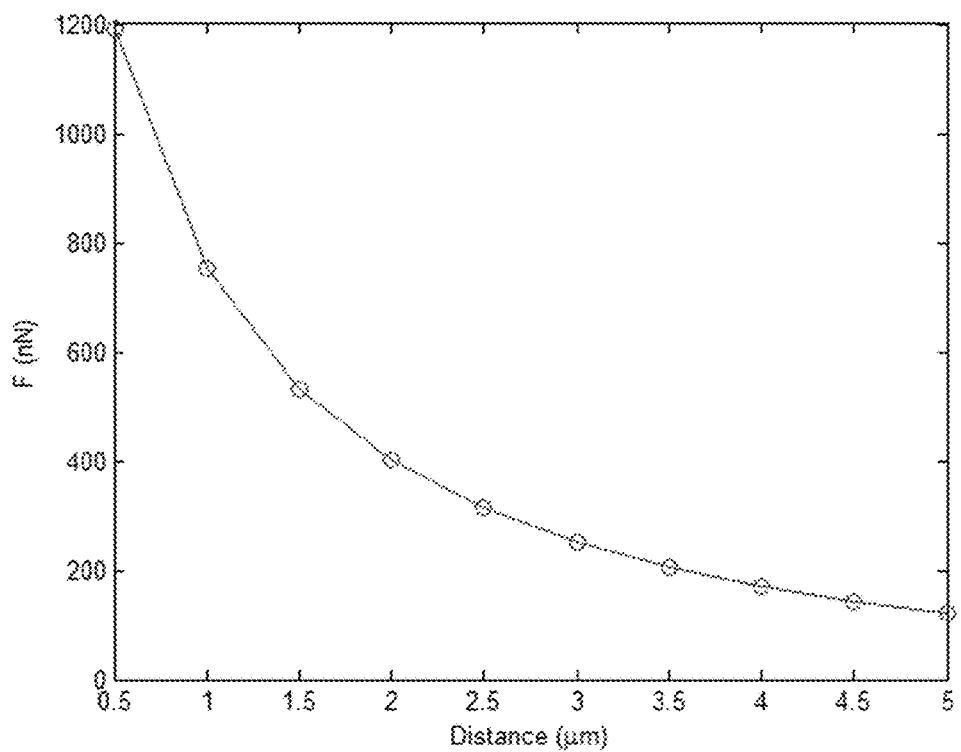
FIG. 5A shows force applied to the outer ring of the DRG by electrodes as a function of electrode-vibratory structure distance.

As shown in FIG. 5A, forces greater than 100 nN can easily be achieved with gaps as large as 5 um. For reference, the force needed to drive a DRG into an n=2 oscillation mode with an amplitude of 1 um on resonance, for a Q~1e6 disk 10, is as low as 0.1 nano Newtons (nN). That force scales linearly with Q, so even with a lower quality factor of Q~100,000 a force of 1 nN would be needed, which is still fairly small. Clearly there is sufficient force to drive the vibratory structure or disk 10 and the drive force is strong enough to be placed further than 5 um away from the vibratory structure 10.

Figure 5B:
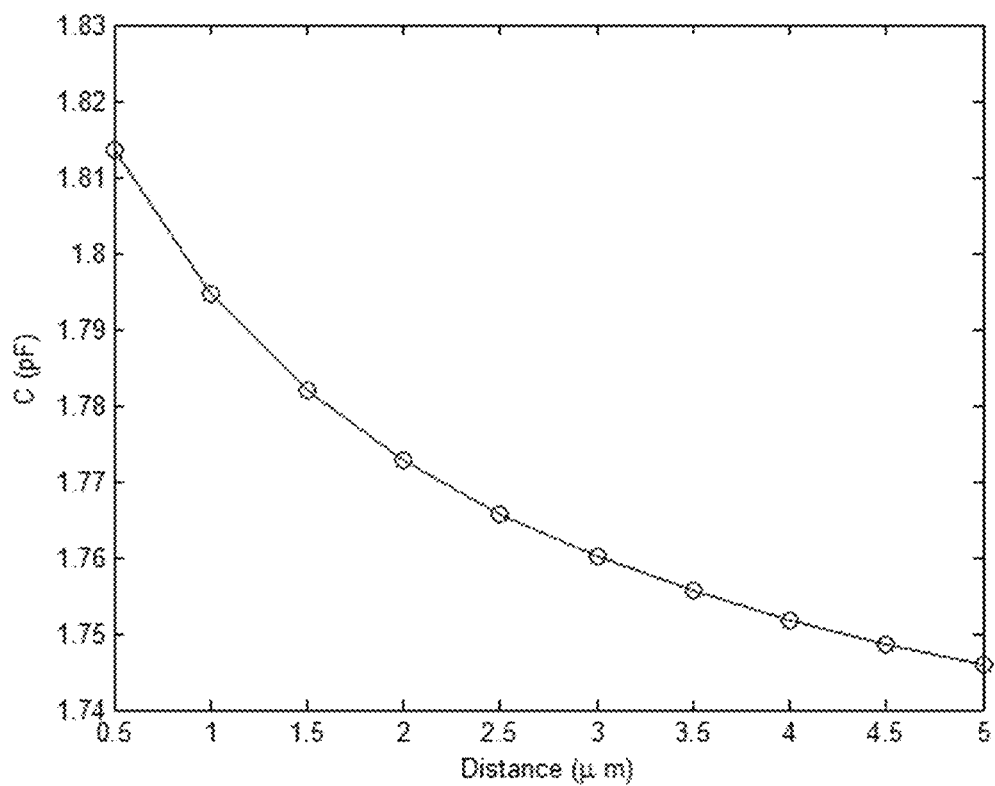
FIG. 5B shows capacitance as a function of electrode-vibratory structure gap.
Figure 5C:
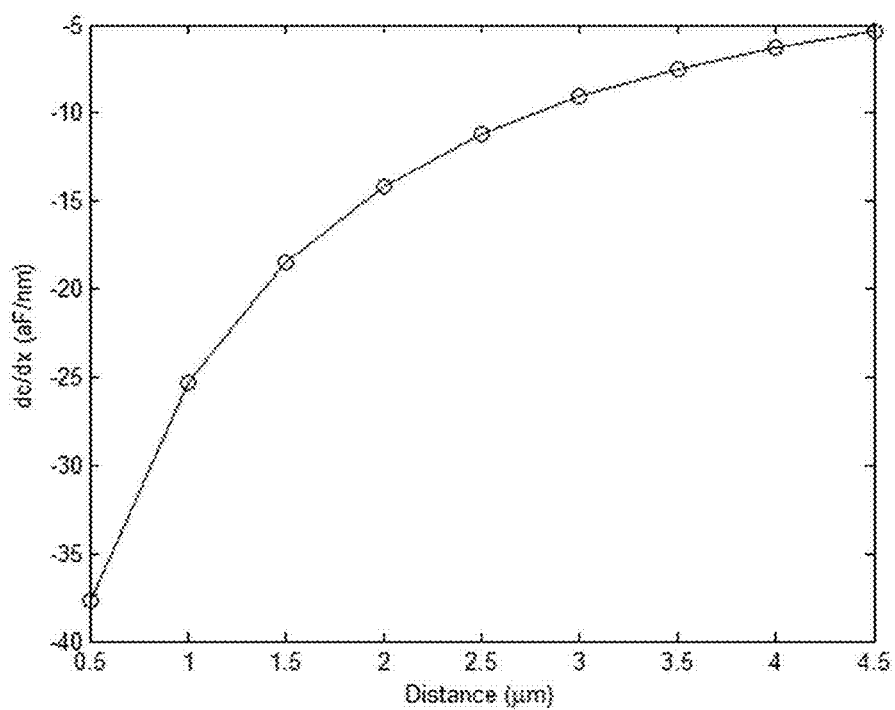
FIG. 5C shows capacitive sensitivity to displacement.
Figure 5D:
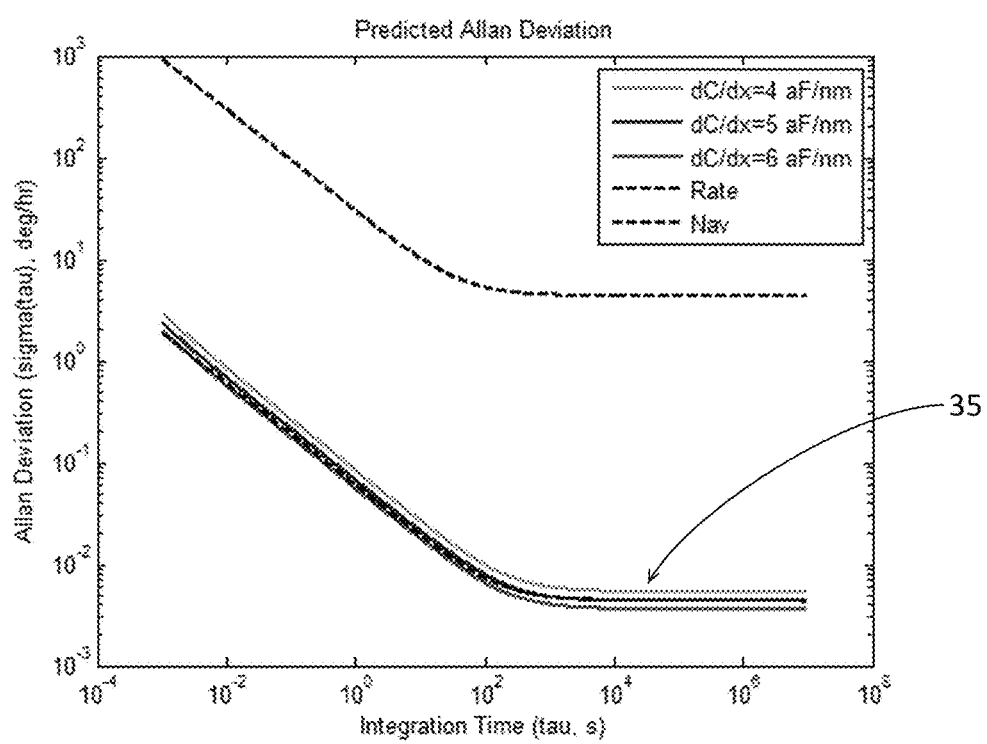
FIG. 5D shows Allan deviation plots for electrical noise in the gyroscope originating from amplifier noise combined with capacitive sensitivity to motion in accordance with the present disclosure.

In the case that the electrode set 30 and 32 is used as a sense mechanism, FIG. 5B shows the corresponding change in capacitance of the electrode set 30 and 32 as a function of the gap between the electrodes 30 and 32 and the vibratory structure 10. The derivative of that curve, shown in FIG. 5C, corresponds to the sensitivity of capacitance to a change in the gap. Sensitivity varies from −5 to −35 aF/nm. Using a noise model from a commercial trans-impedance amplifier (TIA), the electronic noise contribution to gyroscope bias and angular random walk (ARW) can be calculated. The noise of the TIA, which includes white and pink electrical noise, appears as a false perceived rotation and scales with the capacitance sensitivity. Allan deviation (ADEV) plots are shown in FIG. 5D and show calculated electrical noise for sensitivities of 4 aF/nm, 5 aF/nm, and 6 aF/nm using a Linear Technologies LT1169 TIA. For this calculation an amplifier bandwidth is set to 40 kHz. The mechanical mode used is at frequency f of 12 kHz, for a mass of 852 ug, a Bryan's factor of 0.3, and a Q of 1e6. The ADEV plot is divided into three regions by dashed black lines. The three regions correspond to rate grade, tactical grade, and navigation grade, where the lowest region 35 is navigation grade. It can be seen from the ADEV plots of the three sensitivities that achieving sensitivity >5 aF/nm would allow navigation grade performance. More precisely, the ultimate performance of the gyroscope is not limited by the control mechanism for drive, sense, and tuning. It can be shown that for this mechanical structure the mechanical noise contribution is also at the navigation level and therefore the full integrated device would yield <0.01 degree bias stability. The structure thus far simulated covers only $\frac{1}{16}^{th}$ or the diameter of the structure. A factor of two times in performance can easily be gained by sensing on opposite sides of the vibratory structure 10. That, combined with optimization of the electrode spacing and width, allows for less than a 0.001 deg/hr bias and a correspondingly reduced ARW.

A concept analogous to the one developed for the periphery control mechanism can be developed for a configuration where the electrodes 18 are placed on the substrate 12 below the vibratory structure 10, as shown in FIGS. 2D and 2E. As before, a key feature is that the electrodes 18 come in pairs of alternating potential and run perpendicular to the direction of motion so that they will either generate a force or sense motion.

Figure 6A:
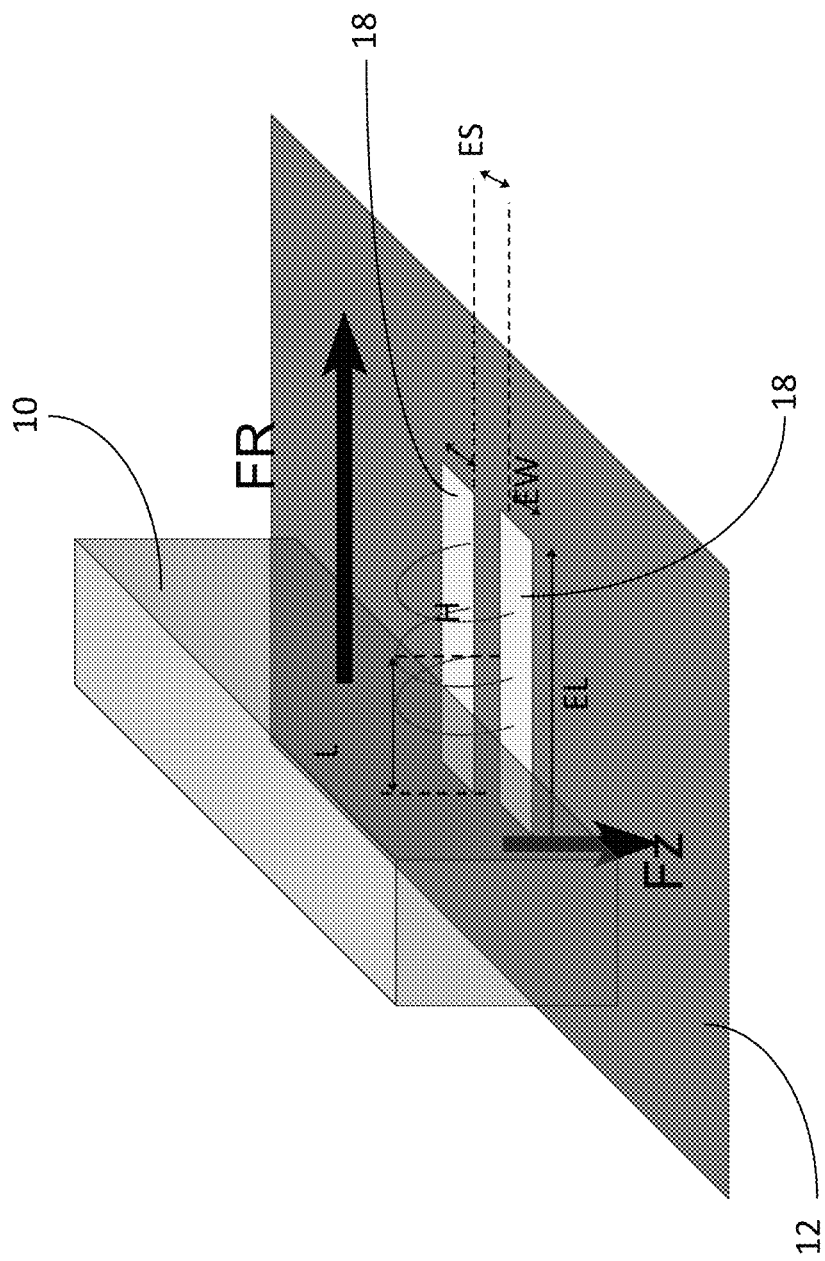
FIG. 6A shows a drive and tuning mechanism.
Figure 6B:
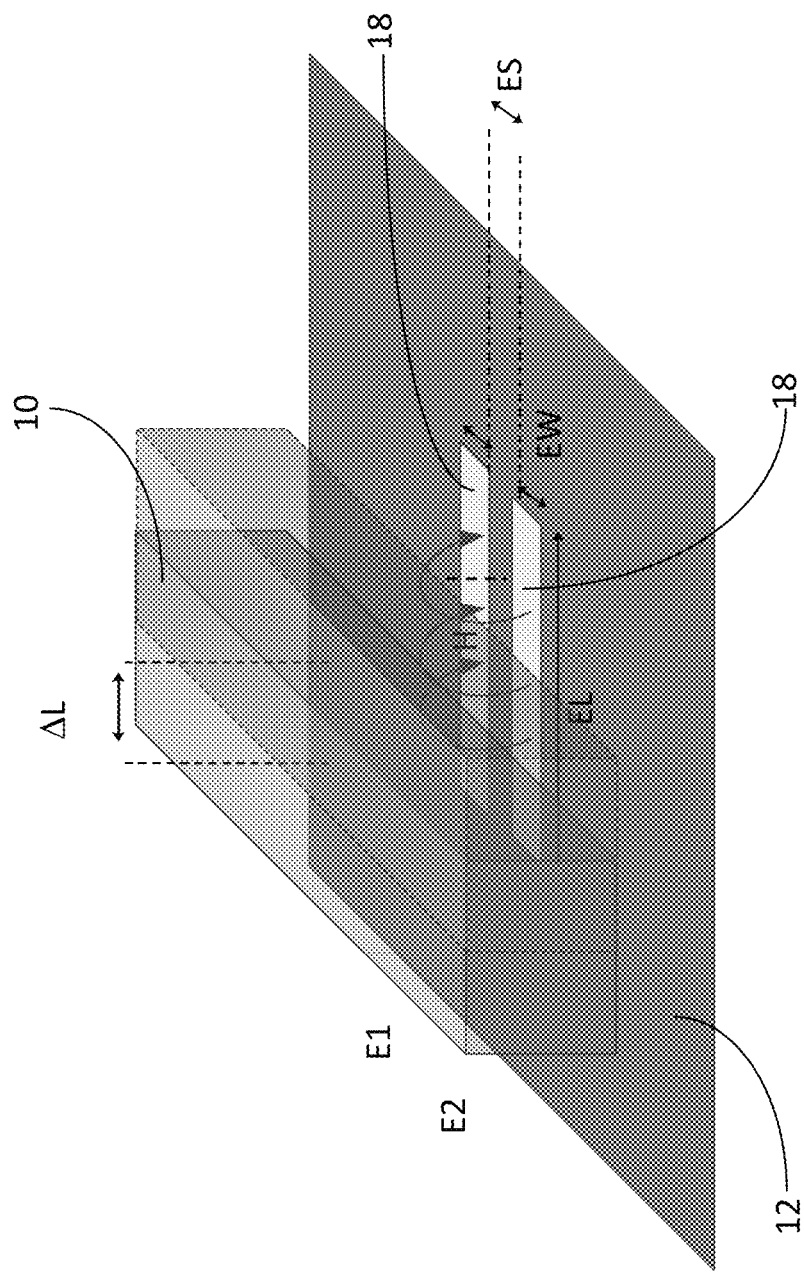
FIG. 6B shows a sense mechanism in accordance with the present disclosure.

FIGS. 6A and 6B show a control mechanism for drive/tune and sense, respectively. As shown in FIG. 6A, a pair of electrodes 18 of width (Ew), separated by a length (Es) are placed on the substrate 12 at a height (H) below a vibratory structure 10. If viewed from above, the dielectric beam 10 partially overlaps with the electrodes by a length (L). In this configuration, the alternating voltages on nearest neighboring electrodes 18 exert a force pulling the vibratory structure along the length of the electrodes 18, shown as Fr, which is a force is in the radial direction of the DRG, as well as pull the vibratory structure down, as shown by arrow Fz. As has been shown via simulations, the proportion of radial to vertical forces can be engineered so Fr>Fz. Furthermore, the force in an operating device may be applied in a sinusoidal fashion at the resonant frequency of the vibratory structure. Motion in the preferential radial direction is amplified by the quality factor, which is Q~1e6 for $SiO_2$. A direct current (DC) force in the <z> direction, which is out of plane, adds an out of plane control over the vibratory structure 10. An often cited concern with flat vibratory structures 10 is their susceptibility to out plane motion due to acceleration. A force in the <z> direction can be used in a control loop to mitigate this out of plane vibration. The converse is also a potential implementation, because out of plane vibration can now be sensed, making the structure both an out of plane accelerometer as well as an in plane gyroscope.

As shown in FIG. 6B the control structure can also be used to sense the motion of the vibratory structure 10. When a DC voltage is applied across nearest neighbor electrodes 18, motion in the beam 10 translates into a change in capacitance. Using a current to voltage conversion transimpedance-amplifier (TIA), the capacitance can be sensed.

Figure 7:
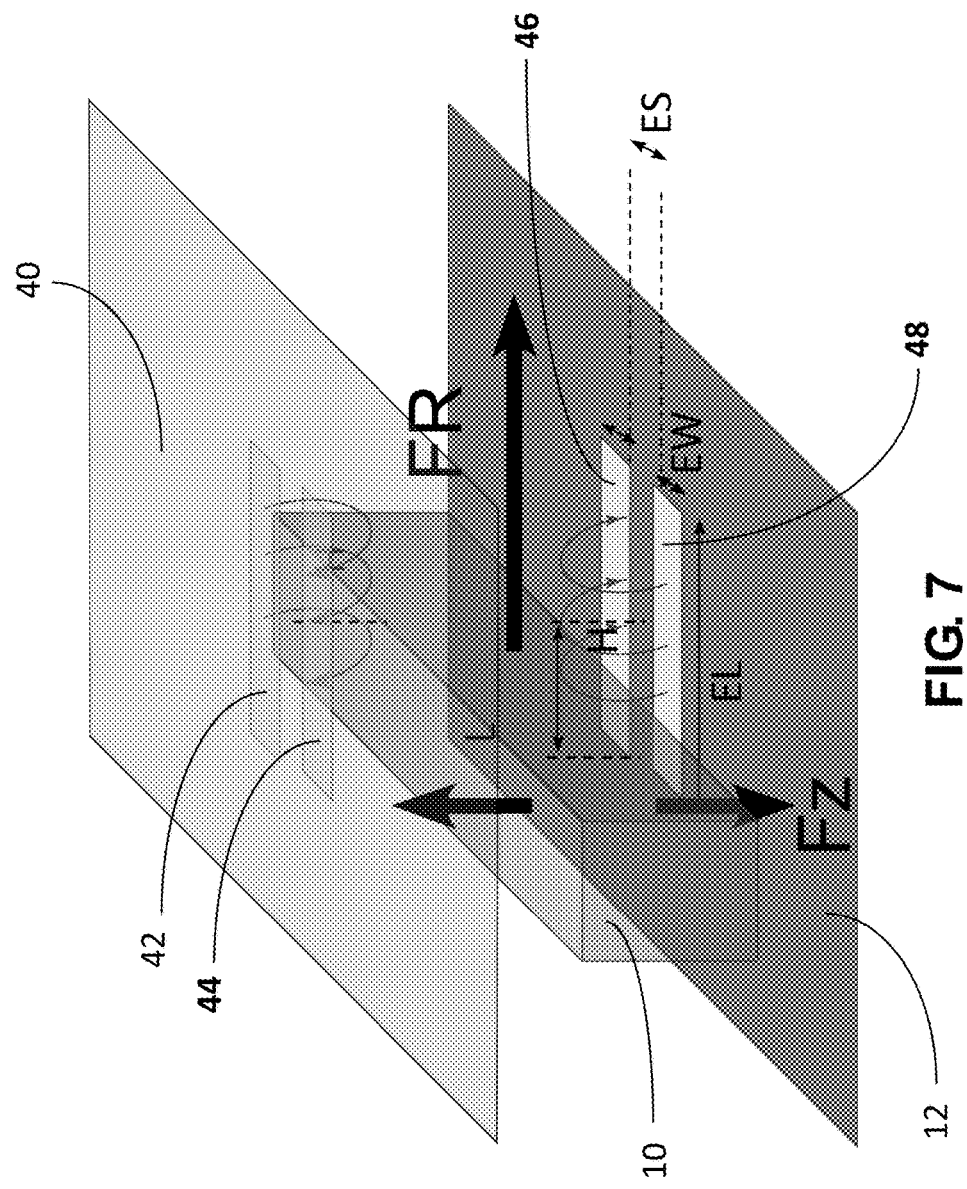
FIG. 7 shows the top and bottom configuration of the control mechanism in accordance with the present disclosure.

The control mechanisms of FIGS. 6A and 6B can be either below the vibratory structure 10, or above the vibratory structure 10, or both above and below the vibratory structure 10. FIG. 7 shows a control mechanism above and below the vibratory structure 10. A cap 40 is put over the vibratory structure 10 and has electrodes 42 and 44 with alternating voltages on nearest neighboring electrodes. Electrodes 46 and 48 are on substrate 12 below the vibratory structure 10. Doubling up the control structure on both above and below doubles both the available force and sensitivity to motion. A differential measurement of out of plane motion can now be implemented to rebalance forces in both up and down directions. To drive an out of plane motion in the vibratory structure 10, the control mechanism may be configured to apply an direct current electrical voltage between electrodes 42 and 46, between electrodes 42 and 48, between electrodes 44 and 46, between electrodes 44 and 48, or between electrodes 42, 44 and electrodes 46, 48. To sense an out of plane motion in the vibratory structure, the control mechanism may be configured to apply an direct current electrical voltage between electrodes 42 and 46, between electrodes 42 and 48, between electrodes 44 and 46, between electrodes 44 and 48, or between electrodes 42, 44 and electrodes 46, 48.

As in the case for the peripheral control mechanism, one can demonstrate performance of the control mechanisms of FIGS. 6A, 6B and 7 via finite element model (FEM) simulations. A single dielectric member may be simulated with two electrodes. The DRG member for the simulation may be 200 um in length, 30 um thick, and 20 um in width. The two electrodes may be 30 um in length ($E_L$), 5 um wide ($E_w$), and spaced by 4 um ($E_s$). This configuration is for illustrative purposes and does not limit the present disclosure. The electrode widths and spacings can be varied within fabrication tolerances and can be as small as 100s of nm to as large as 10s of microns. The vertical spacing is varied in the simulation between 1 and 5 um. Depending the size of the structures the vertical spacing or gap between the DRG member and the electrodes can be smaller (100s of nm) or larger (5-25 um). As described above, an alternating 10V potential may be applied across the electrodes.

To get a sense for total force and total sensitivity one must calculate the values for a $1/16^{th}$ of the DRG as described above. To do so, an effective length is calculated for a DRG structure with 22 rings between R=4 mm and R=2 mm. The motion of the DRG is assumed to be linear, with 0 motion at R=2 mm and maximum motion at R=4 mm. The total force is again significantly larger than needed for driving the structure. The sensitivity varies between ~3 aF/nm and 23 aF/nm.

The same amplifier noise calculation can be done as before to calculate the electronic Allan deviation (ADEV) limit of the full structure. For gaps of 1 um, 2 um, and 3 um the ADEV is well into navigation grade performance. Taking into account that there may be opposing 1/16ths of the vibrating structure 10, as well as top 42 and bottom 18 electrodes, the noise floor due to the transduction mechanism and the amplifier approaches 0.0001 deg/hr.

Figure 8A:
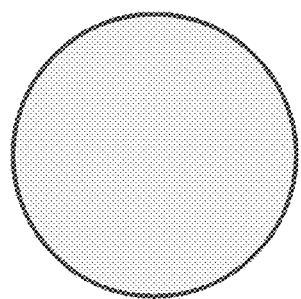
FIGS. 8A, 8B, and 8C show different DRG geometries possible with the gradient control structures in accordance with the present disclosure.
Figure 8C:
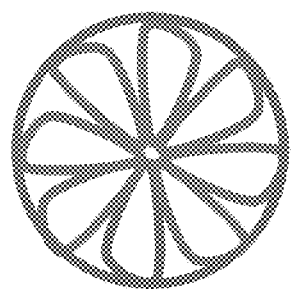
Figure 8B:
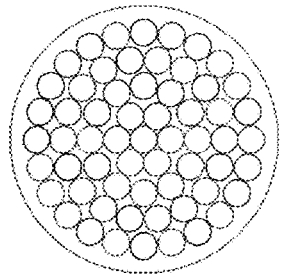

Now that it has been shown that a gradient force control mechanism can be applied to a DRG and thus eliminate the need to have integrated electrodes, the constraints on the shape of the DRG may be significantly relaxed. The shape of the vibratory structure can be chosen to optimize vibration immunity by increasing frequency, reducing DRIE etching complexity by making larger features, and even opening the door for a wet etched structure. For example, FIGS. 8A, 8B, and 8C show different possible configurations for a vibratory structure 10. FIG. 8A shows a solid disk. Another configuration is a disk having a number of openings in the disk with each opening having a shape such as a curved slot, as shown in FIG. 2B or a circular opening, as shown in FIG. 8B. Yet another configuration is a disk having a number of closed loops, as shown in FIG. 8C.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A gyroscope comprising:
   a vibratory structure;
      a first electrode separated from the vibratory structure by a gap; and
      a second electrode directly adjacent the first electrode, the second electrode separated from the vibratory structure by the gap;
   wherein to drive a vibration in the vibratory structure an alternating electrical voltage is applied between the first electrode and the second electrode;
   wherein to sense motion in the vibratory structure a first direct current voltage bias is applied between the first electrode and the second electrode; and
   wherein to tune a resonant frequency in the vibratory structure a second direct current voltage bias is applied between the first electrode and the second electrode.

2. The gyroscope of claim 1 wherein the vibratory structure comprises a dielectric.

3. The gyroscope of claim 1 wherein the vibratory structure comprises silica, fused silica, silicon, low expansion glass, silicon nitride, diamond, silicon carbide, or sapphire.

4. The gyroscope of claim 1:
   wherein the gyroscope is a disk resonating gyroscope; and
   wherein the vibratory structure comprises a disk.

5. The gyroscope of claim 1:
   wherein the vibratory structure comprises a disk, the disk comprising a solid disk, a disk having a plurality of openings in the disk, or a disk having a plurality of closed loops.

6. The gyroscope of claim 5 wherein the plurality of openings in the disk comprise curved slots or circular openings.

7. The gyroscope of claim 1:
   wherein the vibratory structure comprises a disk; and
   wherein the first electrode and the second electrode are adjacent to a periphery of the disk.

8. The gyroscope of claim 7:
   wherein the disk has a thickness; and
   the first electrode and the second electrode have a height that is substantially the same as the thickness of the disk.

9. The gyroscope of claim 7 wherein the control mechanism further comprises:
   at least a third electrode; and
   at least a fourth electrode adjacent the third electrode;
   wherein the third electrode and the fourth electrode are adjacent to one another and adjacent to the periphery of the disk and are on a opposite side of the periphery of the disk than the first electrode and the second electrode;
   wherein to drive a vibration in the vibratory structure, the control mechanism is configured to apply an alternating electrical voltage between the third electrode and the fourth electrode; and
   wherein to sense motion in the vibratory structure, the control mechanism is configured to apply a direct current voltage bias between the third electrode and the fourth electrode.

10. The gyroscope of claim 1 further comprising:
    a substrate;
    wherein the first electrode and the second electrode are on the substrate and separated from the vibratory structure by the gap.

11. The gyroscope of claim 10:
    wherein the first electrode and the second electrode are below the vibratory structure.

12. The gyroscope of claim 11 further comprising:
    at least a third electrode; and
    at least a fourth electrode directly adjacent the third electrode;
    wherein the third electrode and the fourth electrode are above the vibratory structure.

13. The gyroscope of claim 12:
    wherein to drive an out of plane motion in the vibratory structure a direct current electrical voltage is applied between the first and third electrodes, between the first and fourth electrodes, between the second and third electrodes, between the second and the fourth electrodes, or between the first and second electrodes and the third and fourth electrodes.

14. The gyroscope of claim 12:
    wherein to sense an out of plane motion in the vibratory structure a direct current electrical voltage is applied between the first and third electrodes, between the first and fourth electrodes, between the second and third electrodes, between the second and the fourth electrodes, or between the first and second electrodes and the third and fourth electrodes.

15. The gyroscope of claim 10:
    wherein the first electrode and the second electrode are near an edge of the vibratory structure.

16. A method of providing a gyroscope comprising:
    providing a vibratory structure; and
    providing a first electrode separated from the vibratory structure by a gap; and
    providing a second electrode directly adjacent the first electrode, the second electrode separated from the vibratory structure by the gap;
    wherein to drive a vibration in the vibratory structure an alternating electrical voltage is applied between the first electrode and the second electrode; and
    wherein to sense motion in the vibratory structure a first direct current voltage bias is applied between the first electrode and the second electrode; and
    wherein to tune a resonant frequency in the vibratory structure a second direct current voltage bias is applied between the first electrode and the second electrode.

17. The method of claim 16 wherein the vibratory structure comprises a dielectric or a disk.

18. The method of claim 16 wherein the vibratory structure comprises silica, fused silica, silicon, low expansion glass, silicon nitride, diamond, silicon carbide, or sapphire.

19. The method of claim 16:
wherein the first electrode and the second electrode are below the vibratory structure.

20. The method of claim 19 further comprising:
at least a third electrode; and
at least a fourth electrode directly adjacent the third electrode;
wherein the third electrode and the fourth electrode are above the vibratory structure.

21. The method of claim 20:
wherein to sense an out of plane motion in the vibratory structure a direct current electrical voltage is applied between the first and third electrodes, between the first and fourth electrodes, between the second and third electrodes, between the second and the fourth electrodes, or between the first and second electrodes and the third and fourth electrodes.

22. The method of claim 20:
wherein to drive an out of plane motion in the vibratory structure a direct current electrical voltage is applied between the first and third electrodes, between the first and fourth electrodes, between the second and third electrodes, between the second and the fourth electrodes, or between the first and second electrodes and the third and fourth electrodes.

* * * * *